INVENTORS
DENNIS L. WILSON
GORDON R. KNIGHT

INVENTORS
DENNIS L. WILSON
GORDON R. KNIGHT

BY [signature]
ATTORNEY

United States Patent Office 3,453,626
Patented July 1, 1969

3,453,626
ACOUSTIC GONIOMETER
Dennis L. Wilson, Palo Alto, and Gordon R. Knight, Cupertino, Calif., assignors to Sylvania Electric Products Inc., a corporation of Delaware
Filed Dec. 21, 1967, Ser. No. 692,488
Int. Cl. G01s 5/02
U.S. Cl. 343—113     6 Claims

ABSTRACT OF THE DISCLOSURE

This high frequency direction finding system and display comprises a circular array of monopole antennas electrically connected through associated mixers to a corresponding circular array of electro-acoustic transducers which are immersed in an acoustic wave transmitting medium such as water. Each mixer is also connected to a local oscillator for producing difference frequency signals that are applied to the transducers. A column of coherent light from a laser is directed through the acoustic medium transversely of the plane of the transducer array and experiences a phase shift as a result of a change of the index of refraction of the acoustic medium due to acoustic waves generated by the transducers. The phase modulated light is converted to an intensity modulated beam which produces an image on a screen corresponding to the direction from which the original signal was received and the frequency of that signal.

Background of the invention

This invention relates to direction finding systems and more particularly to an improved omniazimuthal Wullenweber type direction finding system.

Present direction finding systems utilizing a circular or other array of antennas are generally restricted to scanning or searching the horizon in the azimuth plane by monitoring a limited sector and sweeping the monitored sector over an entire search area. This technique has the disadvantage of limiting the search area being monitored at any one instant. In other words, it is possible that a signal could appear and disappear in one sector of the search area while the system is searching in a different sector. In addition, goniometers used in such systems provide mechanical sweep arms or similar assemblies to rotate a beam forming device over the array of antennas in order to search the area. Such mechanical systems are inherently slow and are subject to wear and misalignment requiring continual maintenance or frequent replacement. Other systems using a plurality of sweep sensors require complicated switching techniques which are costly to construct and difficult to synchronize and maintain.

An object of this invention is the provision of a direction finding system capable of simultaneously indicating the frequency and direction of arrival of electromagnetic signals originating from a number of sources in the area of search.

Another object is the provision of a direction finding system which eliminates the need for rotating parts or similar devices for sequentially searching limited sectors of the search area.

Summary of the invention

The direction finding system embodying this invention heterodynes a local oscillator signal and electrical signals from a plurality of antennas and translates the beat or difference frequency signals into acoustic signals for changing the index of refraction of a medium. The acoustic signals are generated from sources arranged in the same geometric pattern as the antennas. The point of maximum change in index of refraction in the acoustic medium is directly related to the direction of propagation of the received signal and its frequency. By indicating the relative position of this maximum change of refractive index point on a display, instantaneous omniazimuthal measurement of the direction of propagation and frequency of the received signal is made.

Description of preferred embodiment

Figure 1:
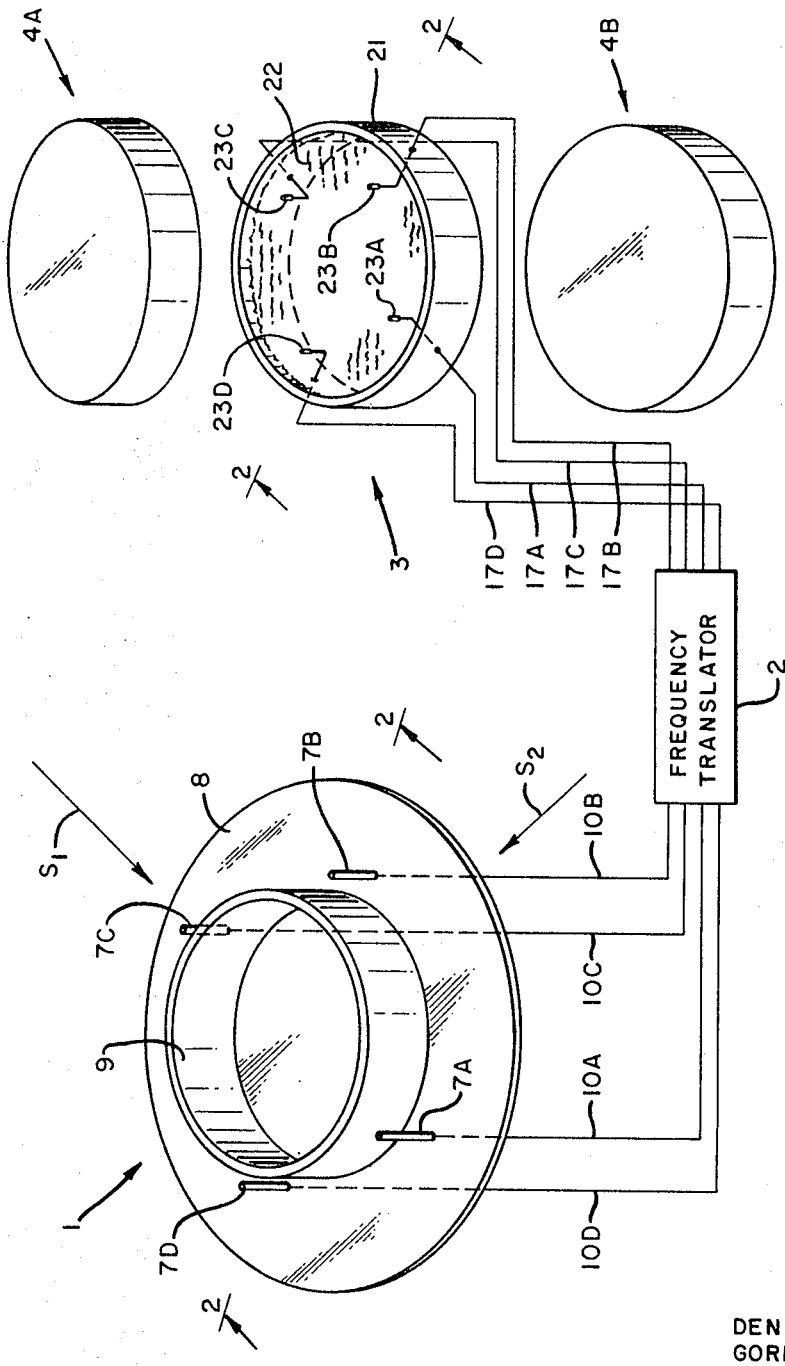
FIGURE 1 is a schematic representation of a direction finding system embodying this invention.

A direction finding system embodying the invention is shown in FIGURE 1 and comprises an antenna array 1, a frequency translator 2, a two-dimensional conversion assembly 3, and readout assembly 4A and 4B. Electrical signals generated by the array 1 are converted to a difference frequency signal by translator 2 and transformed into a two-dimensional energy system by the conversion assembly 3 so as to relate the direction of propagation and frequency of a signal incident upon the array 1 into an identifiable pattern on a two-dimensional display. The readout assembly is responsive to the output of assembly 3 to provide a visual indication of the direction and frequency of the incident signal.

Array 1 comprises a plurality of parallel monopoles 7A to 7D, inclusive, projecting perpendicularly from a ground plane 8. The monopoles are spaced from and disposed in a cylinder coaxial with a cylindrical reflecting screen 9. The monopoles have associated output lines 10A–10D which carry electrical signals to frequency translator 2. As is understood in the art, the relative phases of the electrical signals on lines 10 are functions of the direction of the signal received by the array 1 and the frequency of the signals on lines 10 is equal to the frequency of the received signal.

Figure 2:
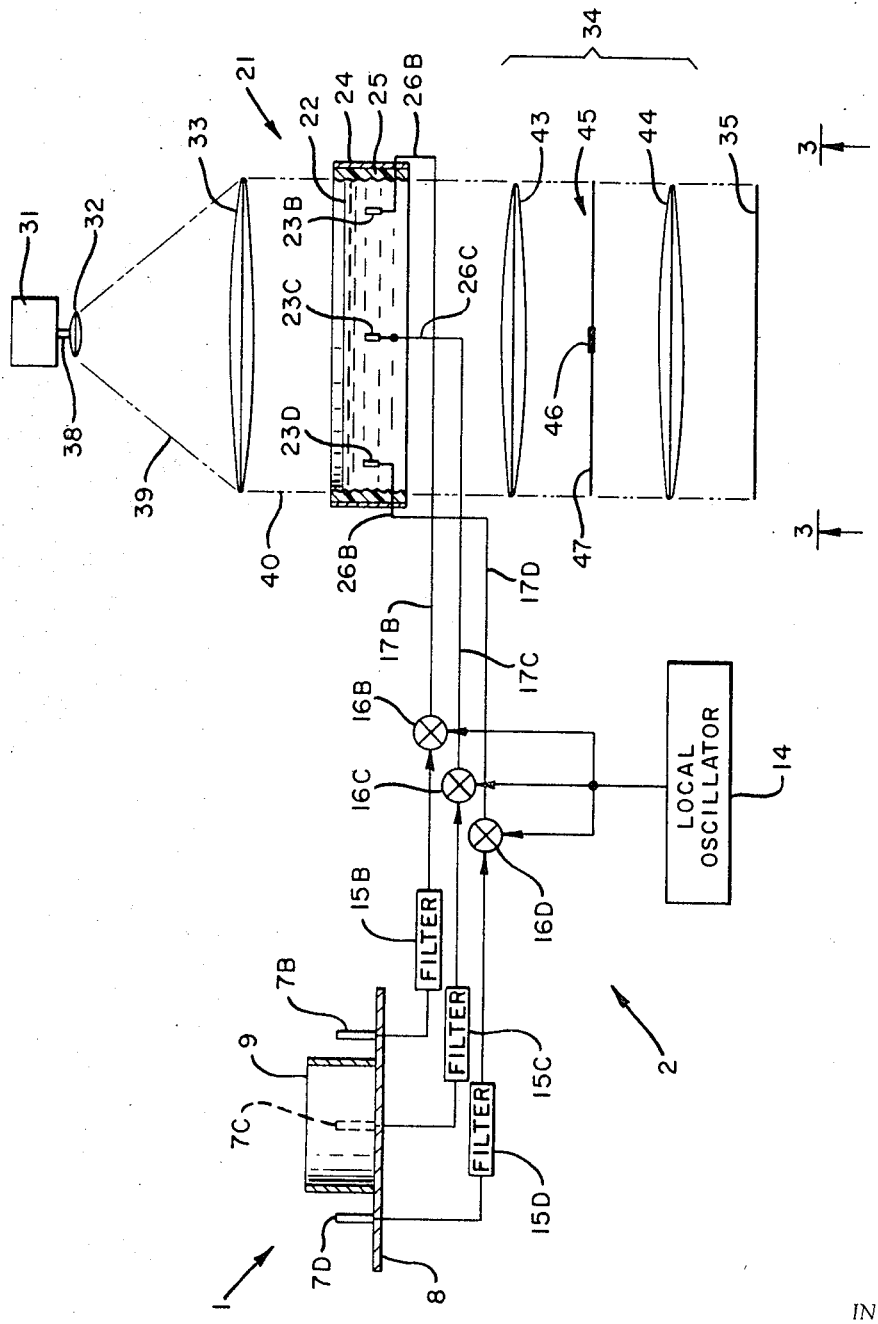
FIGURE 2 is a more detailed schematic representation, partially in section, of the system of FIGURE 1.

Frequency translator 2 comprises fixed frequency local oscillator 14, see FIGURE 2, bandpass filters 15A to 15D, and mixers 16A to 16D. The upper and lower frequency limits of filters 15 determine the frequency band over which the system operates. Mixers 16 are preferably balanced mixers that produce signals on associated lines 17 having a frequency equal to the difference between the frequencies of the local oscillator and received signals.

Conversion assembly 3 comprises a circular tank, see FIGURE 2, containing an acoustic wave transmitting medium 22, such as water, and a plurality of electro-acoustic transducers 23A to 23D, inclusive, immersed in the medium 22. Transducers 23A to 23D lie in a common plane, are spaced from side wall 24 of tank 21, and occupy the same relative positions in the tank as the associated monopoles 7A to 7D, respectively, occupy in the array 1. In other words, the array of transducers 23 is the geometric analog of the monopole array 1. The transducers are preferably omniazimuthal radiators which produce spherical acoustic pressure or compression wavelets which travel through the water and may, by way of example, be barium titanate piezo-electric crystals in the form of small spheres or cylinders. The depth of the water in tank 21 is preferably much less than the diameter of the tank so that the radiators will produce wavelets only in the plane of the tank 21, and reflections from the surface of the tank need not be considered. The inner surface of side wall 24 is lined with acoustic absorbing material 25 such as foam rubber, see FIGURE 2, to prevent acoustic waves incident on the side wall of the tank being reflected through the water. The bottom wall of the tank is transparent. Each transducer 23 is electrically connected by an associated line 26, preferably through the bottom of the tank, to the output on line 17 of an associated mixer, and thus to the monopole in arry 1 which occupies the corresponding position in that array. The difference frequency signals on lines 17 are therefore converted into acoustic vibrations by transducers 23 which propagate in the plane containing the transducers.

The readout assembly comprises a source 31 of coherent light, lenses 32 and 33 to collimate the light, linear spatial filter 34, and screen 35 which are axially aligned with the axis of tank 21. Source 31 may be a laser which produces a coherent light beam 38 comprising a plurality of rays each having equal intensity and phase. Lense 32 is a spherical lens which causes the beam 38 to diverge over the broader area corresponding to the transverse dimensions of tank 21. Lens 33 is also a spherical lens which collimates beam 39 into a column 40 of light comprised of parallel rays which pass through the water in tank 21 in a direction perpendicular to the plane of the transducers. Acoustic vibrations in the water cause these light rays to be phase modulated. In practice, the maximum diameter of tank 21 that can be used for signal processing is limited by the diameter of the collimated beam 40 of coherent light that can be obtained.

Since the eye responds only to variations in light intensity and is insensitive to phase changes in light, the phase modulated light beam from tank 21 must be converted to an intensity modulated light beam. Linear spatial filter 34 comprises lenses 43 and 44 and spatial frequency filter 45 for performing this function. More specifically, filter 34 transforms the phase image in the tank to an intensity image at screen 35.

Lens 43 is a spherical lens that is located one focal length $f_1$, where $f_1$ is the focal length of lens 43, from the bottom of the tank. Spatial frequency filter 45 is a DC stop comprising a very small opaque spot 46 on a glass plate 47. Spot 46 is centered on a line through the centers of lenses 43 and 44. Filter 45 is located one focal length $f_1$ from lens 43. Lens 44 is also a spherical lens which is located one focal length $f_2$, where $f_2$ is the focal length of lens 44, from filter 45 and screen 35. Screen 35 receives rays of light passed by the linear spatial filter 34 and presents for visual observation an indication of the existence of a received signal as well as its direction of propagation and frequency.

Consider that the phase image in the tank is described by $e^{j\psi(x)}$ where $\psi(x)$ represents spatial phase variations caused by the interaction of the acoustic pressure waves and the coherent light. When the phase variations are small (as they are for small changes in the index of refraction of the acoustic medium) the phase image in the tank is representable as $$e^{j\psi(x)} \simeq 1 + j\psi(x)$$

for $\psi(x) \ll 1$. Lens 43 operates on this phase image and forms its Fourier transform in the plane of filter 45. The opaque spot 46 blocks the zero order spatial frequency component, the first term in Equation 1. Thus, only the Fourier transform $F[j\psi(x)]$ of the second term in Equation 1 is passed by filter 45. Lens 44 then forms the Fourier transform of the signal passed by filter 45 on screen 35. This signal formed at the plane of screen 35 is $j\psi(x)$. Since the human eye, and other light detectors, are sensitive to light intensity, an observer will be aware of spots of light intensity $\psi^2(x)$ on the screen. Thus it is seen that the linear spatial filter transforms the plane image defined by Equation 1 to the intensity image $\psi^2(x)$ displayed on screen 35.

In operation, signals received by the antennas are heterodyned with the local oscillator signal by mixers 16 to provide difference frequency signals on lines 17. The difference frequency signals are converted by transducers 23 into acoustic vibrations within the water 22 in tank 21. These acoustic waves converge to a point having coordinates that are related to the direction of propagation of the received signal and its frequency, i.e., the radial distance of this point from the centroid of the transducer array is proportional to the frequency of the received signal and the angular position of the point corresponds to the direction of arrival of the incident signal, as is described more fully hereinafter. Since the transducer and antenna arrays described in the preferred embodiment of the invention are circular, the centroid of the transducer array is the center of the circle. The acoustic waves traveling in the water are actually compression or pressure waves which cause the water to have a maximum change in the index of refraction at the convergence point of the waves since the index of refraction of the water is a function of the water pressure.

Rays comprising light beam 40 passing through the water 22 are phase modulated by the refractive index pattern set up in the water by the acoustic waves. In other words, the acoustic medium phase modulates the collimated beam 40 of coherent light passing through it in a manner to provide a two-dimensional translation of the difference frequency signals which are related to the electrical signals from the antenna array 1.

Figure 3:
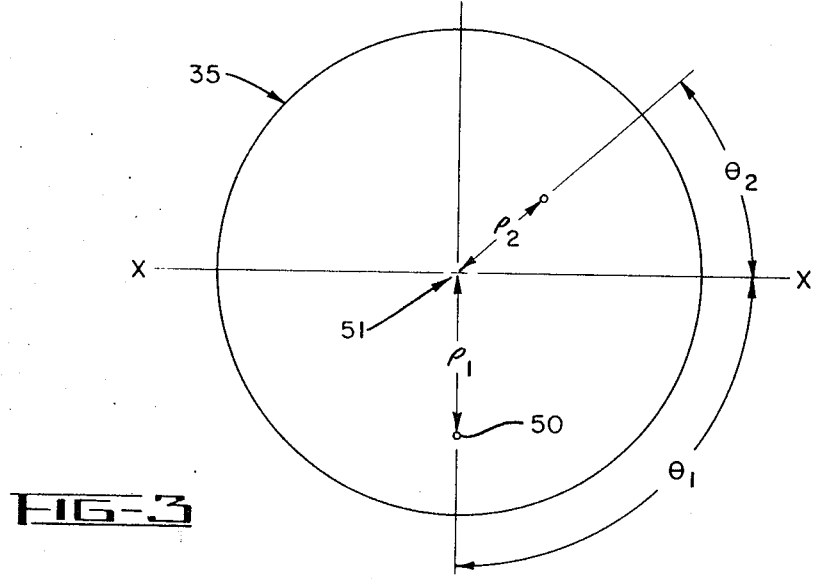
FIGURE 3 is a view of the display screen of the system as viewed on line 3—3 of FIGURE 2.

Spatial filter 34 converts the phase modulated light beam from the tank 21 into an intensity modulated column of light. That is to say, the point of maximum phase change of the column of light caused by the maximum change in the index of refraction in the acoustic medium is converted to a maximum intensity for display purposes. The location of this high intensity spot or point in the column of light incident on screen 35, e.g., spot 50 in FIGURE 3, provides a visual indication of the frequency and direction of arrival of the received signal. The radial distance $\rho_1$ between the center 51 of screen 35 and the spot 50 is proportional to the frequency of the received signal. The angular displacement $\theta_1$ between spot 50 and the reference line X—X indicates the direction of propagation of the received signal $S_1$ in FIGURE 1.

Figure 4:
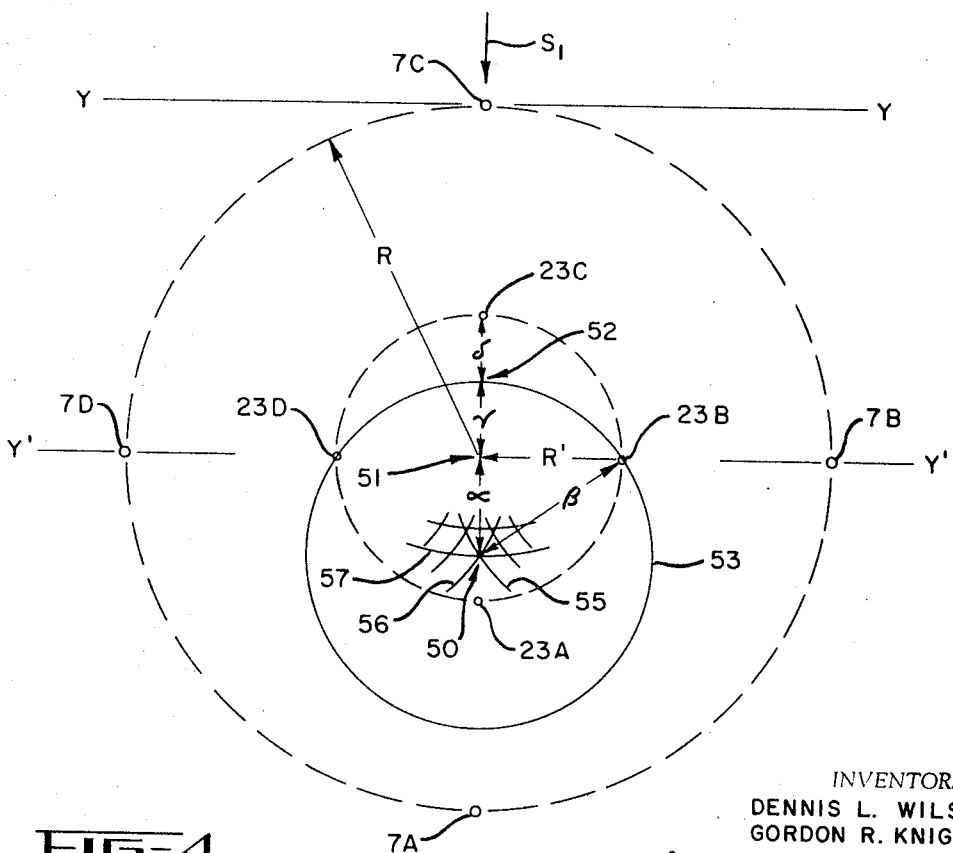
FIGURE 4 is a plan view of an array of acoustic transducers superimposed on an array of antennas for graphically illustrating that the radial distance between the center of the acoustic array and the point of maximum change in the index of refraction is proportional to the frequency of a received signal.

Referring now to FIGURE 4, it will be shown that the radial distance between the center of the acoustic transducer array or screen 35 and a point of maximum change in the index of refraction in the water is related to the frequency of a received signal at the antenna array.

For the sake of convenience of illustration, the circular array of transducers 23 is shown centered within the circular array of monopoles 7. Consider that a plane wave Other changes and modifications to the above described embodiment of the invention may occur to those skilled in the art without departing from the spirit and scope of the invention. Therefore, the claims define the novel features of the invention.

We claim:
1. Apparatus for receiving and indicating the frequency and direction of propagation of an incident electromagnetic signal comprising
 a plurality of antennas disposed in a predetermined configuration to receive said electromagnetic signal,
 means for heterodyning the outputs of said antennas for producing electric signals having frequencies and relative phases related to the frequency and direction of propagation of said electromagnetic signal,
 a medium capable of supporting transmission of acoustic waves,
 electro-acoustic transducers equal in number to said antennas and disposed in a configuration corresponding to said predetermined configuration of the antennas,
 said transducers being energized by the electric signals derived from said antennas, respectively, and producing in said medium an index of refraction pattern having a point of maximum change of index of refraction, the location of said point being proportional to the frequency and direction of propagation of said electromagnetic signal, and
 means for indicating the positional coordinates of said point whereby to identify the frequency and direction of propagation of said electromagnetic signal, said indicating means comprising
 means for illuminating said medium with a coherent electromagnetic wave whereby the refraction pattern phase modulates said wave, and
 means responsive to the modulated wave for indicating the position of said point.

2. Apparatus according to claim 1 wherein said illuminating means comprises a source for producing a collimated coherent light beam and said medium phase modulates said light beam, said indicating means comprising
 a spatial filter adapted to convert said phase modulated light beam to an amplitude modulated light beam, and
 a screen aligned with said modulated beam and producing a visual indication thereon of the relative positions of points of maximum change of index of refraction.

3. A direction finding system for simultaneously indicating the frequency and direction of arrival of incident signals, said system comprising
 a plurality of antennas oriented for receiving the incident radio frequency signals and arranged in a pattern having a centroid point, each of said antennas producing an output signal having a frequency and phase related to the frequency and direction of propagation, respectively, of the incident signals,
 a local oscillator producing a fixed frequency local oscillator signal,
 a plurality of mixer circuits, each of said mixer circuits having a first input receiving the local oscillator signal and having a second input receiving the output of a different one of said antennas for producing difference frequency output signals,
 a medium supporting transmission of acoustic waves and being optically transparent,
 an enclosure having walls and containing said acoustic medium, said enclosure walls being optitcally transparent in a prescribed direction,
 a plurality of electro-acoustic transducers immersed in said medium in a plane substantially perpendicular to said prescribed direction and being arranged in a pattern similar to the pattern of said antennas, each of said transducers receiving the difference frequency signal from a different one of said mixer circuits and thus receiving the output of an associated antenna occupying the same relative position in the pattern of antennas for producing acoustic waves in said medium which combine to form a two-dimensional index of refraction pattern characteristic of the frequency and direction of propagation of incident signals,
 the radial distance between the centroid of said pattern of transducers and each point of maximum change of index of refraction being proportional to the frequency of an incident signal,
 the angular displacement between a line through the centroid of said pattern of transducers and the point of maximum change of index of refraction and a reference line through the centroid of the pattern of transducers indicating the direction of propagation of an incident signal,
 a source producing a beam of coherent light,
 means for collimating said coherent light beam and projecting same on said pattern of transducers in said prescribed direction, said index of refraction pattern in said medium phase modulating said coherent light beam passing therethrough,
 a linear spatial filter receiving the phase modulated light beam from said enclosure for producing an amplitude modulated light beam, and
 an optical screen receiving the amplitude modulated light output of said filter for providing a visual indication of said points of maximum change of index of refraction.

4. The method of identifying the frequency and direction of propagation of an electromagnetic signal consisting of the steps of
 converting said electromagnetic signal into a plurality of electric signals having relative phases indicative of the direction of propagation and having frequencies related to and different from that of the electromagnetic signal,
 translating said electric signals into acoustic energy in an acoustic medium so as to cause the index of refraction of the medium to vary in a pattern related to the phases and frequencies of said signals,
 directing coherent light through said acoustic medium whereby to phase modulate said light,
 changing the phase modulated light to amplitude modulated light, and
 displaying the amplitude modulated light on readout apparatus to give a visual indication of direction of propagation and frequency of said electromagnetic signal.

5. Apparatus for receiving and indicating the frequency and direction of propagation of an incident electromagnetic signal comprising
 a plurality of antennas disposed in a predetermined configuration to receive said electromagnetic signal,
 means for deriving from said antennas electric signals having frequencies and relative phases related to the frequency and direction of propagation of said electromagnetic signal, said deriving means comprising a local oscillator producing a fixed frequency local oscillator signal, and
 mixer circuits equal in number to said antennas and connected to the outputs, respectively, of said antennas and to the output of said local oscillator for producing said electric signals proportional to the difference frequencies,
 a medium capable of supporting transmission of acoustic waves,
 electro-acoustic transducers equal in number to said antennas and being connected to the respective outputs of said mixers and disposed in a configuration corresponding to said predetermined configuration of the antennas,
 said transducers being energized by the electric signals derived from said antennas, respectively, and producing in said medium an index of refraction pattern having a point of maximum change of index of re- Y—Y is incident on the antenna array and is caused by an incident signal shown as the arrow $S_1$ and representable as $$e^{j\omega t} \qquad (2)$$

where $e$ is the base of the natural logarithm, $j=\sqrt{-1}$, $\omega$ is the radian frequency of the signal $S_1$ and $t$ is time. Since the plane through monopole antennas 7B and 7D is physically separated by a distance R (the radius of the antenna array) from the parallel plane through monopole 7C, the wave front Y'—Y' at monopoles 7B and 7D is out of phase with the wave front Y—Y at monopole 7C by the time delay $R/c$ ($c$ is the velocity of light) required for the wave front to travel the distance R. Thus, the signal received by monopoles 7B and 7D is representable as $$e^{j\left(\omega t-\omega\frac{R}{c}\right)} \qquad (3)$$

These signals defined by Equations 2 and 3 are heterodyned with the local oscillator signal to provide a difference signal representable as $$e^{j(\omega t-\omega_0 t)}=e^{j\omega' t} \qquad (4)$$

where $\omega_0$ is the local oscillator radian frequency and $\omega'=\omega-\omega_0$, that is applied to transducer 23C and a signal representable as $$e^{j\left(\omega t-\omega_0 t-\omega\frac{R}{c}\right)}=e^{j\omega'\left(t-\frac{\omega}{\omega'}\frac{R}{c}\right)} \qquad (5)$$

that is applied to transducers 23B and 23D. Reference to Equations 4 and 5 reveals that the phase difference between the signals applied to transducer 23C and transducers 23B and 23D is also $$\omega\frac{R}{c}$$

The radian frequency of the acoustic waves produced in the water by transducers 23, however, is $\omega'=\omega-\omega_0$. Since the velocity $c$ of radio frequency waves in air is much greater than the velocity $v$ of acoustic waves in water ($c=3\times10^8$ meters per second and $v=1.5\times10^3$ meters per second), the acoustic waves in water will only travel the distance $\delta$ from transducer 23C to point 52 during the time required for a plane wave Y—Y in air to travel the distance R between monopoles 7C and 7D. In other words, the phase delay $$\psi_1=\omega'\delta/v \qquad (6)$$

experienced by the acoustic wave in traveling the distance $\delta$ between transducer 23C and point 52 is equal to the phase delay $$\psi_2=\omega R/c \qquad (7)$$

experienced by the plane wave in traveling the distance R between monopoles 7C and 7D. The distance $\delta$ is therefore $$(\omega/\omega')(v/c)R \qquad (8)$$

Since the signals at monopoles 7B and 7D and at transducers 23B and 23D are in-phase, the acoustic waves at point 52 and transducers 23B and 23D are also in-phase. Point 52 and transducers 23B and 23D therefore define 3 points on a circle 53 of equi-phase points which may be constructed by conventional graphic techniques. More specifically, transducers 23B and 23D and point 52 are acoustic wave generators which produce spherical acoustic waves 55, 56 and 57, respectively, that converge at point 50, the latter being the center of the circle 53.

It will now be shown that the distance $\alpha$ between the center 51 of the transducer array and point 50 is proportional to the frequency of the incident signal $S_1$. The circle 53 of equi-phase points is defined as $$\beta^2=(x_2-x_1)^2+(y_2-y_1)^2$$
$$=(R'-0)^2+(\alpha-0)^2 \qquad (9)$$

where $\beta$ is the radius of circle 53 and R' is the radius of the circular array of transducers. The radius $\beta$ of circle 53 is also representable as $$\beta=\alpha+\gamma \qquad (10)$$
$$=\alpha+(R'-\delta) \qquad (11)$$

Equating Equations 9 and 11 the radial distance $\alpha$ is determined to be $$\alpha=\frac{1}{2}\kappa\left(\frac{\omega}{\omega-\omega_0}\right)\frac{\left(2R'-\kappa\frac{\omega}{\omega-\omega_0}\right)}{\left(R'-\kappa\frac{\omega}{\omega-\omega_0}\right)} \qquad (12)$$

where:

$$k=Rv/c$$

Thus, it is seen that the radial distance $\alpha$ between the center 51 of the acoustic array and the center 50 of the circle 53 is a function of the radian frequency $\omega$ of the incident signal. The radial dimension $\alpha$ actually decreases as the radian frequency $\omega$ of the incident signal increases. If a number of signals such as $S_1$ and $S_2$ are incident on the antenna array at the same time, an equal number of points of convergence will be set up in the acoustic medium and will be indicated simultaneously on screen 35.

By way of example, in an actual system designed to operate over a frequency band of 2 mHz. to 30 mHz., the radius R of the antenna array 1 is nominally 150 meters. The local oscillator frequency and radius R' of the transducer array are then selected to provide a dimension $\alpha$ that is less than R' at the lowest operating frequency of the antenna. Alternatively, if the maximum diameter of the transducer array is limited by the readout assembly, the local oscillator frequency is computed from Equation 12. Thus, if the acoustic medium is water in which acoustic waves have a velocity of $1.5\times10^3$ meters per second and the radius R' of the transducer array is 0.1 meter the local oscillator frequency is nominally 2 mHz. It is not desirable to make the radius R' of the transducer array correspond to the charge in wavelength of the signals in air and water since the radius R' would be very small (approximately 0.5 millimeter).

Reference to Equation 12 reveals an important feature of this invention, that the received signal must be heterodyned with a local oscillator signal before it is applied to the transducers. Specifically, if the local oscillator frequency is zero, the radial distance $\alpha$ is no longer a function of frequency and acoustic waves caused by incident signals having different frequencies all converge to the same point.

Thus, an important feature of this invention is that the received signal be heterodyned with a local oscillator signal before it is applied to the transducers. Another feature of this invention is that the relative geometric arrangement of the monopoles in array 1 and the arrangement of transducers 23 in the acoustic medium 21 be similar. That is to say, the transducers should be arranged in the same geometric pattern as the monopoles although at a different scale, if preferred. Another feature of the invention is the utilization of an appropriate medium in which the transducers are immersed whereby acoustic waves generated by the transducers are propagated efficiently.

While a collimated beam of coherent light is described above as the mechanism by which the point of maximum change of index of refraction in the acoustic medium is located, other techniques may be employed to accomplish this object. For example, a polarized incoherent light beam or radio frequency waves may be passed through the acoustic medium and appropriate polarized detectors utilized to locate the point corresponding to the point of maximum change in the index of refraction in the medium.

If desired, a transducer could also be moved through the acoustic medium in a predetermined pattern such as a raster scan and the output of the transducer monitored on a suitable display screen such as a cathode ray tube.

fraction, the location of said point being proportional to the frequency and direction of propagation of said electromagnetic signal, and means for indicating the positional coordinates of said point whereby to identify the frequency and direction of propagation of said electromagnetic signal.

6. The method of identifying the frequency and direction of propagation of an electromagnetic signal consisting of the steps of receiving said electromagnetic signal with a plurality of antennas, heterodyning the outputs of said antennas to produce a plurality of electric signals at intermediate frequencies having relative phases indicative of the direction of propagation of the electromagnetic signal, translating said electric signals into acoustic energy in an acoustic medium so as to cause the index of refraction of the medium to vary in a pattern related to the phases and frequencies of said signals, directing coherent light through said acoustic medium whereby to phase modulate said light, changing the phase modulated light to amplitude modulated light, and displaying the amplitude modulated light on readout apparatus to give a visual indication of direction of propagation and frequency of said electromagnetic signal.

References Cited

UNITED STATES PATENTS

| 2,898,589 | 8/1959 | Abbott | 343—113 |
| 3,205,495 | 9/1965 | Wilmotte | 235—181 X |

RICHARD A. FARLEY, *Primary Examiner.*

RICHARD E. BERGER, *Assistant Examiner.*

U.S. Cl. X.R.

235—181; 340—6; 343—100